United States Patent Office

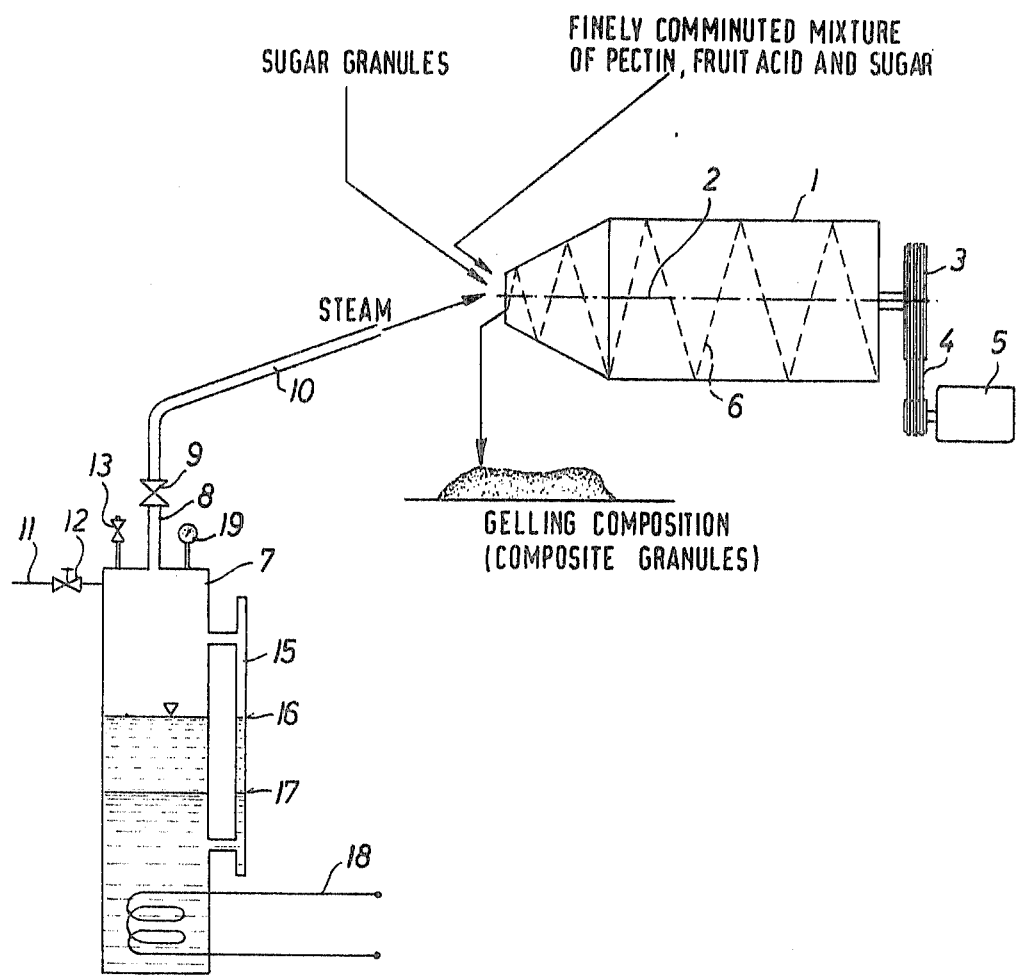

3,595,676
Patented July 27, 1971

3,595,676
GELLING AGENT AND METHOD OF MAKING
AND USING THE SAME
Arnold Langen, Haus Etzweiler, and Henry Thiele, Wevelinghoven, Germany, assignors to Pfeifer & Langen, Cologne, Germany
Filed May 25, 1966, Ser. No. 552,839
Claims priority, application Germany, May 26, 1965, P 36,893; Dec. 1, 1965, P 38,243
Int. Cl. A23l *1/04*
U.S. Cl. 99—132                                 9 Claims

ABSTRACT OF THE DISCLOSURE

Preparing a granular composition suitable for making jams and jellies by finely grinding together equal portions of pectin and sugar, admixing this finely ground mixture with large wet sugar granules until the surfaces of the large sugar granules are coated with the finely ground pectin-sugar mixture. Fruit acid and powder may also be added along with the pectin-sugar mixture.

---

The present invention relates to a gelling agent and a method of making and using the same.

More particularly, the present invention is concerned with a gelling agent which may be advantageously used for making fruit jellies, jams and similar edible products, however, the present invention encompasses also a method of making the gelling agent and a method of making such food products utilizing the gelling agent of the present invention.

Fruit jellies and jams are frequently produced by boiling fresh fruit which generally has a solids content of about 10% consisting of cellulose, aromatic compounds, etc., with an equal amount of sugar. Thereafter, a gelling agent is added.

If dry pectins, and possibly in addition thereto fruit acids such as citric acid and buffer salts, are used as the gelling agent or composition, it is necessary to add the pectin first and the sugar thereafter since pectin is not soluble in the relatively concentrated aqueous sugar solution formed by adding the sugar to the fruit.

It has been proposed to avoid the inconvenience of having to add two separate materials, and to introduce sugar and pectin simultaneously into the fruit mass. Nevertheless, whenever fresh fruit is not available, it is usually necessary to combine with the sugar and gelling agent frozen fruit, or fruit or fruit juices which had been previously preserved and which have to be taken from cans, glass containers or the like and which may first have to be mixed with water in order to obtain the desired concentration.

It is an object of the present invention to provide a method and a gelling agent which overcomes the aforementioned difficulties and disadvantages and which facilitate the producing of jams, jellies and the like.

Gelling agents frequently contain pectin as the essential ingredient and include, in addition thereto, an organic acid, preferably a fruit acid such as citric acid or tartaric acid. It has been proposed to utilize dry gelling agents in such a manner that, in the production of jams and jellies, the gelling agent is first combined with the fruit juice or fruit pulp and thereafter sugar is added. This sequence, as has been pointed out above, is important because pectin will be dissolved in an aqueous solution only if the solids concentration of the solution does not exceed about 40%. Therefore, if in producing the fruit jelly or jam the sugar would be added first to the fruit pulp or the like, the solids content of the thus formed aqueous solution would exceed the maximum concentration at which the pectin can be dissolved.

It is one of the disadvantages of the conventional gelling agents, particularly when the same are to be used for making preserves on a relatively small scale, for instance by the housewife, that the gelling agent has to be introduced first and the sugar thereafter. It has been attempted to overcome this requirement of observing a definite sequence of introduction of gelling agent and sugar by using liquid gelling agents in which the pectin is present in dissolved form. These liquid gelling agents may also contain the required fruit acid or the like. In this case it is no longer decisive in which sequence gelling agent and sugar are introduced. However, the liquid gelling agents are connected with the further disadvantage that chemical preserving and/or sterilization of the same is necessary since pectin solutions form an excellent nutrient for the growth of a large variety of microorganisms. Furthermore, these gelling agents have the additional disadvantage that two different constituents, namely the gelling agent and the sugar must be introduced into the fruit juice or fruit pulp mass.

It is therefore a further object of the present invention to overcome the above-discussed disadvantages and to provide a gelling agent which contains all of the ingredients which have to be added to the fruit juice or fruit pulp, i.e., the pectin as well as the fruit acid such as citric or tartaric acid, and the sugar. The objection which was raised against such proposition, namely that the degree of sweetness is thereby predetermined by the amount of sugar which will be introduced simultaneously with the required amount of gelling agent, has been found to be of little significance, since extensive investigation in Germany has shown that about 85% of all housewives prefer jellies, jams and the like of substantially the same degree of sweetness. Furthermore, it is of course also possible in connection with the gelling agent including all of the required sugar, as proposed according to the present invention, to change the total amount of the sugar which is introduced, because additional sugar may be added and, furthermore, because gelling agent-sugar combinations of varying sugar content can be provided. It is necessary in connection therewith to consider that with reduced sugar content the boiling time of the preserves, jams, jellies or the like must be prolonged since the storability of preserves, jams, and jellies of low sugar content is not as good as that of higher sugar content. Furthermore, it is also possible to change the total amount or proportion of a gelling agent including sugar and produced in accordance with the present invention, in which case—if the proportion of gelling agent, and thus of sugar is reduced—the boiling time has to be prolonged if the finished product, be it jam, jelly, or preserve is to be stored for extended periods of time.

It is yet another object of the present invention to simplify the making of preserves, jams, jellies and the like, either on an industrial scale or in the case of home preserving, and to make it possible to produce such jams, jellies and preserves in a simple and economical manner not only during the time of availability of fresh fruit but throughout the entire year, without having to rely on frozen or preserved fruit or fruit juices as the source of the fruit constituent of the finished product.

It is still a further object of the present invention to provide a dry product which has to be mixed only with water and then subjected to a suitable heat treatment in order to produce the desired fruit jelly or the like.

Other objects and advantages of the present invention will become apparent from a further reading of the description and the appended claims.

With the above an other objects in view, the present invention contemplates a gelling composition adapted upon introduction into an aqueous liquid to form a gel, comprising, in combination, a major proportion of sugar and a minor proportion of pectin of medium or low degree of esterification, the free surface area of the pectin being sufficiently large so that upon introduction of the gelling composition into an aqueous liquid the pectin will be dissolved prior to an increase in the concentration of dissolved sugar in the aqueous liquid to a level impeding dissolution of the pectin.

It is also within the scope of the present invention to provide a method of producing a gelling composition consisting essentially of pectin-coated sugar granules, comprising the steps of rendering the surface of the sugar granules adhesive, and adhering finely subdivided pectin to the thus-formed adhesive surface of the sugar granules so as to form thereon a coating at least partially covering the sugar granules, respectively.

Furthermore, the present invention is concerned with a method of producing an edible fruit composition, which method comprises the steps of introducing into an aqueous liquid, in any desired sequence, at least one substance selected from the group consisting of fruit powder and concentrated fruit juice, and a gelling composition which comprises a major proportion of sugar and a minor proportion of pectin of medium or low degree of esterification, and so composed that the free surface area of the pectin will be sufficiently large so that upon introduction of the gelling composition into the aqueous liquid the pectin thereof will be dissolved prior to an increase in the concentration of dissolved sugar in the aqueous liquid to a level which would impede dissolution of the pectin, followed by boiling the thus formed mixture.

Preferably, according to the present invention, the gelling composition or gelling sugar of the present invention will consist predominantly of sugar, it might contain, for instance, 98% by weight of sugar, about 1% by weight of pectin and about 0.8% by weight of a fruit acid such as citric acid or tartaric acid, and will be so formed that the major proportion of the sugar granules, or at least a substantial portion of the surface of the individual sugar granules, is covered with a layer formed of the pectin and the fruit acid.

Thus, preferably the gelling composition of the present invention will consist essentially of a mass of composite granules, each of the granules comprising a coarse core portion consisting essentially of sugar, such as a sugar granule, and a cover layer consisting at least partly of pectin, the cover layer covering at least a portion of the surface of the sugar granules, respectively, which portion of the surface is sufficiently large so that upon introduction of the gelling composition into the aqueous liquid, the pectin of the cover layer will be dissolved prior to raising the concentration of the dissolved sugar in the aqueous liquid to a level impeding dissolution of the pectin.

It is important according to the present invention that the pectin is of medium or low degrees of esterification and, generally, the degree of esterification of the pectin should be between about 60 and 38, and most preferably about 44.

The pectin-covered sugar granules may be produced by covering relatively large sugar particles which, in view of their relatively large size have a relatively small surface area per unit of volume, with a closed layer which may be formed by applying to the sugar granules a solution of pectin and citric acid and which is adhered to the sugar granules by drying.

It is however also possible in accordance with the present invention, and frequently preferred, to cover the coarse sugar granules with finely subdivided pectin, or preferably with a mixture of jointly ground pectin and citric or other fruit acid. The adherence of the pectin-citric acid layer to the sugar granule can be accomplished in any desired manner, preferably adhesively by contacting the sugar granules with moisture, for instance with a small amount of steam which will suffice to moisten the surface of the sugar granules and thereby to render the same adhesive so that the finely subdivided pectin and acid particles will adhere as a thin layer to the adhesive surface of the respective sugar granule. It is not important in this connection that the coating covers the surface of the sugar granule in its entirety. It suffices if a sufficient portion of the surface of the individual sugar granules is covered with the pectin layer (which may include fruit acid, buffer salts and the like) so that the dissolution of the sugar in an aqueous liquid is sufficiently retarded to permit disolution of the pectin layer before the sugar concentration in the aqueous liquid has risen to an extent which would prevent dissolution of the pectin.

As pointed out above, it is important, according to the present invention, to use pectin which is only of a medium or low degree of esterification, although the conventionally used more highly esterified pectins would be more economical since they can be directly derived from natural products such as apples. However, pectins of a high degree of esterification are connected with the disadvantage that they form gels not only at ambient temperature but also in hot solutions and that this gelification is not reversible. For this reason, the more highly esterified pectins are less suitable, or in fact unsuitable, for the purpose of the present invention, and it is intended to use only pectin of medium or low degree of esterification, notwithstanding the fact that the production of such pectins of medium or low degree of esterification, preferably a degree of esterification of between about 60 and 38, require special processing.

The use of more highly esterified pectins in connection with the present invention would cause difficulties because, due to premature gelling in hot condition, the dissolution of the pectin would be retarded. Particularly if the individual sugar granules are not completely covered with a pectin layer, this would result in premature dissolution of relatively large proportions of sugar prior to complete dissolution of the pectin layer and thereby, due to increase of sugar concentration of the solution, the complete dissolution of the pectin layer would be prevented. If, however, in accordance with the present invention, pectin of only medium or low degree of esterification is used, then the reversibility of the gelification process at elevated temperatures has a favorable effect.

During boiling of the aqueous liquid into which the gelling composition consisting of pectin-coated sugar granules has been introduced in accordance with the present invention, i.e. by using pectin of a relatively low degree of esterification, the outer face of the pectin coating will be first dissolved whereas the inner portion of the pectin coating, i.e., the portion of the pectin coating which is directly adjacent the sugar granule will be maintained for a somewhat longer period of time, due to the lower temperature of the sugar core, and thereby will prevent premature exposure of the sugar core to the surrounding hot liquid and this again will retard dissolution of the sugar core.

Furthermore, more highly esterified pectins, which are not to be used in accordance with the present invention, capable of gelling at ambient and high temperatures and the gelification of which will not be reversed upon heating, will cause adhesions at the rim of the cooking vessel as well as local overheating which in turn will cause caramelization of sugar.

In contrast to the utilization of conventional liquid gelling agents, it is not necessary in connection with the use of the gelling composition of the present invention to require that the fruit juice or pulp must first be boiled with sugar for a short period of time, such as 10 seconds, and that thereafter, upon termination of the boiling, the liquid pectin is to be added, followed by boiling for a few more seconds. It is also not necessary, in accordance with the present invention, to compensate for the reduced sterilization effect due to short boiling time, by increasing the amount of sugar which is introduced in conjunction with the liquid gelling composition. By proceeding in accordance with the present invention, it is thus also not necessary to overcome the undesirable taste caused by an excessive amount of sugar by adding additional citric acid or the like.

The effect of the gelling composition or gelling sugar of the present invention is such that a relatively short boiling time of between 1 and a few minutes will suffice. To limit the boiling time in units of minutes permits control of the boiling time with conventional kitchen timers such as are available for instance under the trade name "Minute Minder" and does not require the use of a stop watch or other device which permits to ascertain the passage of a limited number of seconds.

Several modifications are within the scope of the present invention. Thus, for instance, it is possible to achieve dissolution of the pectin prior to dissolution of a large proportion of the sugar, by providing a mixture of sugar and pectin particles wherein the pectin particles are sufficiently smaller than the sugar particles so that the surface area of the pectin particles relative to their volume is much greater than the surface area of the sugar particles relative to the sugar volume. This is accomplished by grinding the pectin to a very small particle size, preferably grinding fruit acid to the same small particle size, and mixing the pectin, preferably also fruit acid, with the sugar granules without, however, adhering the pectin to the surface of the individual sugar granules.

It is however preferred to utilize the pectin coated sugar granules described further above, inasmuch as a mixture of large sugar granules and small pectin and acid particles might lose its uniformity, inasmuch as the more finely subdivided pectin and acid particles possibly might separate from the sugar granules during processing, packaging or transportation of the product.

It is also possible, in accordance with the present invention, to incorporate in the pectin coating surrounding and adhering to the individual sugar granules conventional compounds which will break the coating to a desired extent upon introduction of the composite granules into the aqueous solution.

The adherence of the pectin coating, with or without an addition of acids such as citric acid or tartaric acid, to the surface of the individual sugar granules may be carried out by subjecting the sugar granules to contact with a small amount of steam so that the surface of the sugar granules will become adhesive, or by other means which will make the surface of the sugar granules adhesive, or also by introduction of an adhesive solution which will adhere to the sugar granules and will in turn cause adherence of the pectin thereto. Thus, for instance, a small amount of sugar solution or of invert sugar solution or of a mixture of sugar and invert sugar may be introduced so as to serve as the adhesive which will adhere the pectin particles to the sugar granules.

The sugar solution may be replaced by other solutions of organic binder materials, for instance a pectin solution.

Such adhesive solutions must be of a composition which will permit dissolution of the same after the outer pectin cover layer has been dissolved so that the underlying surface of the sugar granule will then be quickly exposed to the aqueous solution and thus will be dissolved.

When it is desired to use a mixture of sugar granules and finely subdivided pectin, without forming composite granules thereof, then it is also within the scope of the present invention to apply to the sugar granules a thin coating of a suitable substance which will retard the solution of the underlying sugar granule for a sufficient length of time to permit substantial dissolution of the pectin particles before the sugar concentration of the solution rises to a level at which the pectin will no longer be dissolved.

According to another preferred embodiment of the present invention, the mixture may consist of relatively coarse sugar granules and of finely subdivided pectin, fruit acid and, in addition, finely divided sugar in an amount approximately equal to the amount of pectin.

The sugar granules must be considerably larger than the particles of pectin although the size of the sugar granules may vary within a wide range. It is of course generally advantageous to use sugar granules of a size which is commercially available and to adjust the particle size of the pectin, of the fruit acid and possibly of a small proportion of finely ground sugar so as to achieve in combination with the conventional sugar the desired sequence of dissolution, namely such that the pectin will be dissolved prior to dissolution of a substantial portion of the relatively coarse sugar granules. Preferably, the sugar granules will be of a size between about 0.3 and 2 mm., most preferably about 0.5 mm., and the particle size of the finely ground pectin, fruit acid and small proportion of sugar will be between about 2 and 50 microns, most preferably about 10 microns.

In the case of composite granules consisting of a sugar core which is at least partially covered with a pectin-containing layer, preferably the thickness of the cover layer will be between $\frac{1}{50}$ and $\frac{1}{1000}$ and most preferably about $\frac{1}{300}$ of the diameter of the sugar granule forming the core portion of the composite granule.

As pointed out further above, the present invention is also concerned with a method of producing fruit jellies, jams and other fruit products, according to which into preferably cold water a fruit powder or a highly concentrated fruit juice and the gelling composition of the present invention are introduced in any desired sequence, i.e. either simultaneously or so that either the fruit or the gelling composition is introduced first, followed by boiling of the thus formed mixture.

It is possible in accordance with the present invention to mix the individual constituents of the finished product in any desired quantities in any desired manner or to introduce the same singly in any desired sequence and thus one is not limited to the specific amounts which are contained in commerically or otherwise available cans or the like. This is an advantage in the case of commercial fruit processing, as well as for the housewife making jams, jellies or the like at home.

The fruit powder or fruit juice concentrate preferably will be free of added sugar since the required amount of sugar is contained in the gelling composition. However, it is also possible to utilize sweetened fruit concentrate, or to add sugar in addition to the amount of sugar contained in the gelling composition, if the sweetness of the product is to be increased.

Since it is possible to introduce the fruit powder or fruit juice concentrate and the gelling composition simultaneously, it is also possible to provide a mixture of both of these components, particularly a mixture of dry fruit powder and the gelling composition.

It is thus another object of the present invention to provide for the making of fruit jellies and jams, fruit-sugar-gelling compositions which only need to be introduced into water and heated to form the finished product.

Such fruit-containing composition may consist for instance of between 2 and 5% of fruit powder and between 98 and 95% of the above-described gelling composition of the present invention.

According to another embodiment of the present invention, the gelling composition will consist of a mass of composite granules, each granule comprising a sugar core, i.e. a sugar granule which is completely or partly covered not only with a cover layer or coating of pectin and possibly also a fruit acid such as citric acid, but also with fruit powder.

It is accomplished in this manner that the fruit powder-containing gelling composition need only to be introduced into water and the thus formed mixture brought to boiling, in order to prepare the finished fruit jelly or the like. The fruit powder forming part of the cover layer at least partially surrounding the individual sugar grains will make the cover layer more dense and thus will form an even better protection against premature dissolution of the sugar core. The fruit powder used for the cover layer should be finely comminuted, preferably to about the same size as described further above for the finely subdivided pectin and acid.

The various layers may be formed on the individual sugar granules in any desired sequence so that, for instance, the sugar granules may be first coated with pectin and citric acid as previously described, and thereafter a layer of fruit powder may be superposed upon the pectin coating; or the sugar granules may be first coated with a layer of fruit powder and, superposed thereon, the pectin and citric layer may then be formed.

The thus obtained fruit-containing gelling composition makes it possible to use the conventional packaging for the gelling sugar and/or conventional sugar in a new and highly advantageous manner.

Since the weight per unit of volume of the fruit powder-containing composite granules is considerably lower than that of an equal volume of water, and since approximately equal amounts by weight of water and of the fruit powder-containing gelling composition are to be mixed, it is possible to pack the fruit powder-containing gelling composition in water-tight bags and to print or otherwise apply to the bag a marking indicating the level to which the bag has to be filled with water in order to contain an amount by weight of water equal to the weight of the fruit powder-containing gelling composition initially contained in the bag.

In the case of a transparent packaging material, the bag may be thus marked either at its inner or at its outer face.

By utilizing fruit powder-containing composite granules as described above and packaged in water-tight bags carrying a marking indicating the amount of water which should be filled into the same for mixing with the gelling composition, the making of fruit jellies is particularly simplified since the housewife or the like has only to pour the composite granules into a cooking vessel, thereafter filling the bag from which the composite granules were taken with water up to the abovedescribed marking and add this amount of water to the granules in the cooking vessel.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings in which the drawing is a schematic illustration of an arrangement for producing the gelling composition of the present invention in the form of a mass of composite granules.

As shown in the drawing, a mixing drum 1 is arranged rotatable about a horizontal axis 2 and driven for rotation by means of belt pulley 3, belt drive 4 and motor 5. The supporting structure for the mixing drum has been omitted from the drawing. In the interior of mixing drum 1 will be seen conventionally arranged screw thread 6 which serves upon rotating the drum in one direction, to maintain the mass introduced into the drum within the same and, by rotating of the drum in the opposite direction, to discharge the mass from the mixing drum.

The drum is rotated preferably at about 30 r.p.m. and sugar granules as well as finely subdivided pectin powder, preferably also finely subdivided fruit acid are introduced into the drum.

Steam at a gauge pressure of about 0.2 atmosphere is introduced into the drum from water boiler 7, through conduit 8, valve 9 and conduit 10. Water boiler 7 is furthermore provided with water inlet conduit 11 including valve 12, and with safety valve 13. The diameter of the water boiler is between about 100 and 120 mm., and it will be seen that the water 7 has attached thereto a water gauge 15 which is marked at 16 and 17.

Boiler 7 is provided with an electric heating device 18, supplying, for instance 2,000 watts at 220 volts. The pressure within the container 7 is indicated on pressure gauge 19.

In the above-described arrangement, for instance 10 kg. of composite granules forming a gelling composition of the present invention may be produced by introducing into the mixing drum 9.74 kg. of granular sugar of the desired particle size, thereafter 0.217 kg. of pectin powder of the desired smaller particle size, and mixing these two constituents for about 10 minutes in dry condition. Thereafter, while continuing to rotate mixing drum 1 at 30 r.p.m., 0.043 kg. steam are passed from water boiler 7 into mixing drum 1, whereby the amount of steam which is to be thus introduced into the mixing drum can be determined by the drop of the water level in boiler 7 from the marking 16 down to the marking 17. This vertical distance is so chosen, taking into consideration the daimeter of boiler 7, that a drop of the water level from marking 16 to marking 17 corresponds to the formation and delivery of 0.043 kg. steam. The steam effects an even mixing of the various constituents in mixing drum 1 and the formation of the composite granules, inasmuch as due to introduction of the steam, a very thin film of an unsaturated sugar solution is formed on the surface of the individual sugar granules and the strongly hygroscopic pectin powder will then be embedded in this layer of sugar solution.

After completing introduction of the steam, which should take about 3 minutes, the mixing drum is further rotated for 20 minutes and thereby formation of the composite granules is completed.

The thus produced mass of composite granules forming a preferred embodiment of the gelling composition of the present invention is then withdrawn from the mixing drum and packaged.

Preferably, the pectin powder of the above example is replaced by a finely comminuted mixture of 34% of pectin of medium or low degree of esterification, 34% of finely comminuted sugar and 32% of finely comminuted fruit acid such as citric acid or tartaric acid.

These finely comminuted constituents are ground separately or joined to such an extent that 80% thereof have a particle size of less than 30 microns.

The mixing drum used in the process, as described above by way of example only, has a diameter of 300 mm. and a length of 700 mm.

Due to the fact that heating coils 18 in boiler 7 will always remain below the water level therein, steam will be withdrawn in the form of saturated steam. Valve 9 and conduits 8 and 10 are so dimensioned that introduction of 0.043 kg. of saturated steam into the mixing drum will take about 3 minutes.

The granular gelling composition produced as described above is then filled into bags which preferably are formed of three flexible layers, the outermost and innermost layers being of paper, and interposed therebetween a polyethylene foil will be arranged. It has been found that bags of the above-described sandwich structure are particularly suitable for packaging the product of the present invention, since the welding step which is required for combining two polyethylene foils in the forming and closing of a polyethylene bag will not be required. The composite bags made of such sandwich material are watertight and, if desired, transparent, and may be provided at the outer circumference with an annular marking indicating the level to which the bag is to be filled with water in order to contain the amount of water required for producing a jelly from the gelling composition initially contained in the bag.

The numerical examples contained in the following tables are given as illustrative only, without limiting the invention to the specific details thereof.

In all of the tables, the use of an apple pectin of a medium or low degree of esterification is described. However, it is of course also possible to substitute for the apple pectin an equivalent amount of a pectin which is soluble in hot water and produced from different raw materials such as citrus pectin.

TABLE 1

[Entire mixture, percent by weight]

|  | Maximum | Preferred | Minimum |
|---|---|---|---|
| Sugar | 98.5 | 97 | 85 |
| Apple pectin | 3 | 0.9 | 0.3 |
| Fruit acid | 2.0 | 0.75 | 0.5 |
| Fruit pulp | 7.0 | 3.0 | 2.0 |
| Concentrated fruit juice | 12.0 | 8.0 | 4.0 |
| Buffer salts | 1.0 | 0.4 | 0.1 |
| Water | 1.0 | 0.4 | 0.1 |
| Calcium-citrate (in the case of the use of low esterified pectin) | 1.0 | 0.2 | 0.1 |

TABLE 2

[Composition of pectin-coating, percent by weight]

|  | Maximum | Preferred | Minimum |
|---|---|---|---|
| Sugar | 50 | 34 | 0 |
| Fruit acid | 50 | 34 | 20 |
| Pectin | 50 | 32 | 20 |
| Buffer salts | 12 | 8 | 0 |
| Calcium citrate | 12 | 8 | 0 |

TABLE 3

[Size of the different particles of the mixture]

|  | Maximum | Preferred | Minimum |
|---|---|---|---|
| Sugar (ca. 97% of the entire mixture), mm | 2.0 | 0.5 | 0.3 |
| Sugar (ca. 1% of the entire mixture), microns | 50 | 10 | 2 |
| Fruit acid, microns | 50 | 10 | 2 |
| Pectin, microns | 50 | 10 | 2 |

A gelling composition according to the present invention and consisting for instance of composite granules containing 98% sugar, about 1% pectin of medium or low degree esterification and about 1% of fruit acid, the pectin and the fruit acid forming a coating substantially covering the individual sugar grains, may be used for producing strawberry jam by using 2.2 pounds of unprepared strawberries, 5 tablespoons of water, and 2.2 pounds of the above-described gelling composition. The jam is produced by preparing the fruit and crushing the same in a pot having a volume of 3 liters. Thereafter the water and the gelling composition are added, and the mixture is stirred until dissolved and then stirred occasionally under heating until it starts to boil. Boiling is continued for 4 minutes and the thus produced strawberry jam is then potted and sealed.

In substantially similar manner, a jelly may be prepared from fruit syrup or strongly sweetened juices, for instance raspberry juice, by introducing into the cooking vessel ½ pint of the fruit syrup or strongly sweetened juice, 1 pint of water, 2.2 pounds of the above-described gelling composition and the juice of two lemons.

The gelling composition and water are heated in a 3-liter pot under stirring and then boiled briskly for 1 minute. Thereafter the juice of the 2 lemons and the syrup or the strongly sweetened juice are added, the mixture is boiled briskly again, potted and sealed.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing a granular composition suitable for preparing a jelly which comprises grinding together substantially equal amounts of pectin of a degree of esterification between about 60 and 38 and sugar until the average size of the particles of the mixture of sugar and pectin is below about 30 microns for at least 80% of the mixture, admixing with said mixture sugar granules having an average particle size between 0.3 mm. to 2 mm., wetting the surface of the sugar granule, thereby causing it to become sticky to allow the pectin to adhere thereto, coating said surface with the mixture comprising sugar and pectin particles until a major proportion of the surfaces is coated with the mixture, and collecting said composition.

2. A process for making a granular composition suitable for preparation of a jelly which comprises grinding together a substantially equal proportion of sugar and pectin, the pectin being of a degree of esterification between about 60 and 38, until the average size of the particles of the mixture comprising pectin and sugar is between about 2 to 50 microns, adding to said mixture sugar granules having an average size of about 0.3 mm. to about 2 mm., wetting the surface of the sugar granules to cause their surface to become sticky to allow the pectin to adhere thereto, and coating the sticky surface of the sugar granules with the mixture comprising sugar and pectin particles until a major proportion of the surface of the individual sugar granules is covered with the mixture.

3. The process of claim 2 in which the sugar and pectin are ground together in the presence of fruit acid.

4. The process of claim 3 in which the fruit acids are at least one of the following acids: citric or tartaric acid.

5. The process of claim 2 in which the grinding of the sugar and pectin is carried out until at least 80% of the particles of the mixture have an average size of less than about 30 microns.

6. The process of claim 2 in which the sugar granules are wetted with steam to cause their surface to become sticky.

7. The process of claim 2 in which the sugar granules are wetted with a pectin solution.

8. The process of claim 2 in which there is admixed buffer salts with the mixture comprising pectin and sugar.

9. The process of claim 2 which comprises the step of adding fruit acid to the mixture comprising sugar and pectin at least prior to the wetting step.

References Cited

UNITED STATES PATENTS

| 1,629,716 | 5/1927 | Leo | 99—132 |
| 1,818,263 | 8/1931 | Leo | 99—132 |
| 2,429,660 | 10/1947 | Zenzes | 99—132 |
| 2,701,767 | 2/1955 | Twieg et al. | 99—132 |

RAYMOND N. JONES, Primary Examiner

J. M. HUNTER, Assistant Examiner